US006669124B2

(12) United States Patent
Lazzer et al.

(10) Patent No.: US 6,669,124 B2
(45) Date of Patent: Dec. 30, 2003

(54) SAFETY DEVICE FOR A FOOD PROCESSOR WITH A LARGE CHUTE

(75) Inventors: Jean-Pierre Lazzer, Montchanin (FR); Pascal De Jenlis, Saint Cloud (FR)

(73) Assignee: Hameur S.A., Pontpierre (LU)

( * ) Notice: Subject to any disclaimer, the term of this patent is extended or adjusted under 35 U.S.C. 154(b) by 0 days.

(21) Appl. No.: 10/138,103

(22) Filed: May 2, 2002

(65) Prior Publication Data

US 2003/0205635 A1 Nov. 6, 2003

(30) Foreign Application Priority Data

May 2, 2001 (FR) .............................. 01 05876

(51) Int. Cl.[7] .............................................. B02C 25/00
(52) U.S. Cl. ........................................ 241/36; 241/37.5
(58) Field of Search ...................... 241/36, 37.5, 282.1, 241/282.2; 366/205, 206

(56) References Cited

U.S. PATENT DOCUMENTS

| 3,892,365 A | 7/1975 | Verdun | |
| 4,216,917 A | * 8/1980 | Clare et al. | ............... 241/37.5 |
| 4,226,373 A | 10/1980 | Williams | |
| 4,506,836 A | 3/1985 | Williams | |
| 4,512,522 A | 4/1985 | Williams | |
| 4,523,720 A | 6/1985 | Behringer et al. | |
| 4,614,306 A | 9/1986 | Doggett | |
| 4,674,690 A | 6/1987 | Ponikwia et al. | |
| 4,741,482 A | 5/1988 | Coggiola et al. | |
| 4,819,882 A | 4/1989 | Stottmann et al. | |
| 6,375,102 B1 | * 4/2002 | Bouleau et al. | ............ 241/37.5 |

* cited by examiner

Primary Examiner—Mark Rosenbaum
(74) Attorney, Agent, or Firm—Duane Morris LLP

(57) ABSTRACT

A safety device for a food processor, enables operation of the motor only when a pusher occupies the chute through which food products are introduced, thus preventing injury to the hands. The pusher has a rib, the lower end of which bears against a slider that can have a parallelogram cross section with inclined opposite end faces. When the pusher is advanced so the rib passes the slider, the rib displaces the slider laterally. The displaced slider in turn displaces a lid rod. The lid rod bears against a bowl rod. The lower end of the bowl rod operates a switch.

12 Claims, 4 Drawing Sheets

SAFETY DEVICE FOR A FOOD PROCESSOR WITH A LARGE CHUTE

BACKGROUND OF THE INVENTION

The present invention relates to food processors or other appliances for processing food and, in particular, to a device intended to be used with the said processors to allow them to process large-sized food while at the same time avoiding any possible contact between the hand and the rotating tool.

Such processors comprise a base containing an electric motor, the shaft of which projects from the upper part of the base to receive a rotating tool inside a bowl mounted removably on the base, the said bowl being closed by a lid from which there projects a chute through which the food to be processed is introduced, the base including a switch against which the lower end of a safety rod extending along one generatrix of the bowl bears, the upper part of the rod coming into contact with a cam borne by the lid. A processor such as this is described in U.S. Pat. No. 3,892,365 (Verdun).

The lid is fixed to the bowl removably and the food to be processed is introduced into the chute and then pushed through it by a pusher designed to slide in the chute.

To avoid any contact between one of the user's hands and the rotating tool driven by the electric motor, the hopper is generally tall and of small cross section, preventing the user from inserting a hand. A safety lock is provided to inhibit operation of the processor until the lid is locked in place on the bowl in the operating position.

This locking effect is obtained by a cam formed at the lower part of the lid and which closes a switch fixed in the base of a processor only when the lid is appropriately locked onto the bowl. Various embodiments allow the command needed to be applied to the switch directly or via mechanical or magnetic linkages.

Unfortunately, the geometry of the chute, while it prevents hands from being introduced, also limits the size, shape and amount of food that can be processed. It has already been proposed that use be made of wider chutes for processing food of a larger size, but safety considerations also need to apply in this case.

A chute protector is described in U.S. Pat. No. 4,226,373, this protector comprising a sleeve designed to slide around the chute, the said sleeve including a safety control member for the motor which cannot be started except if the sleeve is appropriately positioned on the chute. A pusher is mounted captively at the upper part of the sleeve so that this pusher can be moved back and forth inside the chute but cannot be withdrawn from the sleeve. In that patent, the pusher of the food introduced into the chute closes access to the widened chute when the sleeve is appropriately positioned on the chute, to allow the processor to work.

Another protective solution is described in U.S. Pat. No. 4,523,720. A cylindrical hopper of a diameter roughly equal to the diameter of the working bowl closed by a lid is fixed onto the working bowl. The cylindrical hopper is closed by a hopper lid which needs to be appropriately positioned thereon before the motor of the processor can be switched on.

In both instances, the protective device has to be completely removed when the food to be processed is loaded into the widened chute. This results in a discontinuous mode of operation which is disagreeable.

To alleviate this drawback, U.S. Pat. Nos. 4,614,306 and 4,614,690 also propose protecting the chute with something articulated to the lid of the bowl between a closed position over the opening of the chute and a position away from the opening. To validate the switching-on of the motor using the aforementioned switch, that patent envisages, above a control rod arranged along a generatrix of the bowl, a second control rod which is pushed by hand when the chute protector is in the closed position.

Although the arrangements described in these patents lead to a simplification in terms of operation by comparison with American U.S. Pat. No. 4,226,373, it nonetheless remains the case that filling the chute once again entails an additional operation of pivoting the chute protector out of the way.

To remedy this drawback, it has already been proposed that the member controlling the switching-on of the motor be included not in a chute protector but in the pusher itself. Such a proposal appears in the embodiments of FIGS. 5 to 7 of U.S. Pat. No. 4,741,482. In that patent, the control member is a magnet fixed into the pusher and which, when the pusher is introduced into the chute, faces a magnetic rod and transmits the field of the magnet of the pusher to a magnetic switch situated in the base. The magnetic rod may be made in two parts, one borne by the working bowl and the second by the lid. Aligning the two rods corresponds, on the one hand, to the locking of the bowl on the base and, on the other hand, to the locking of the lid on the bowl. Thus, it is possible for the chute to be refilled only by extracting the pusher, which simplifies operation.

However, such transmission of magnetic energy entails a pusher magnet with a strong field and, what is more, magnetic disturbances may arise near the pusher and the transmission rods.

SUMMARY OF THE INVENTION

An object of the present invention is to overcome these drawbacks and to propose a mechanical solution for an operating safety device for a wide-cross-section chute which may be of short height.

According to the invention, the mechanical safety device for a food processor, comprising a base containing an electric motor, to which there is removably attached a bowl closed by a lid, the bowl being equipped with a bowl safety rod, loaded by a spring, acting on a switch mounted in the base, the lid having at least one chute for introducing the food, is characterized in that the lid is equipped with a lid rod aligned with the bowl rod, the pusher having a longitudinal projection bearing against a member for converting the vertical movement of the pusher into a vertical movement of the lid rod, causing the lower end of the lid rod to bear against the upper part of the safety rod of the bowl and causing the lower part of the rod to bear against the switch. A converting member able to move in horizontal or oblique translation is to be understood as meaning any known means allowing a vertical translational movement to be converted into another vertical translational movement such as a slider, a rocker, a ball, etc.

According to another feature of the invention, the independent moving member moves against the upper wall of a housing containing the lid rod and is held in a position the opposite of its starting position once the pusher has been introduced into the chute.

According to another feature of the invention, the projection of the pusher has, at its lower end, an inclined surface bearing against an inclined face of a parallel-sided slider, the second face of which presses against the upper end of the second safety rod in the lid.

The lid rod or second rod is returned constantly upwards by a return spring. Thus, as soon as the pusher is removed from the chute, the spring, via the lid rod, returns the slider to its starting position, contact with the bowl rod being interrupted and the latter rising towards the top of the bowl, under the action of its spring, breaking contact with the switch which opens again.

To take up the lateral clearance of the lid rod, the latter may be made in two parts hinged together, the upper part being able to pivot on the upper end of the lower part.

BRIEF DESCRIPTION OF THE DRAWINGS

Features and advantages of the invention will become apparent in the course of the description which will follow of some particular embodiments which are given solely by way of nonlimiting example with reference to the figures which depict.

DETAILED DESCRIPTION

Figure 1:
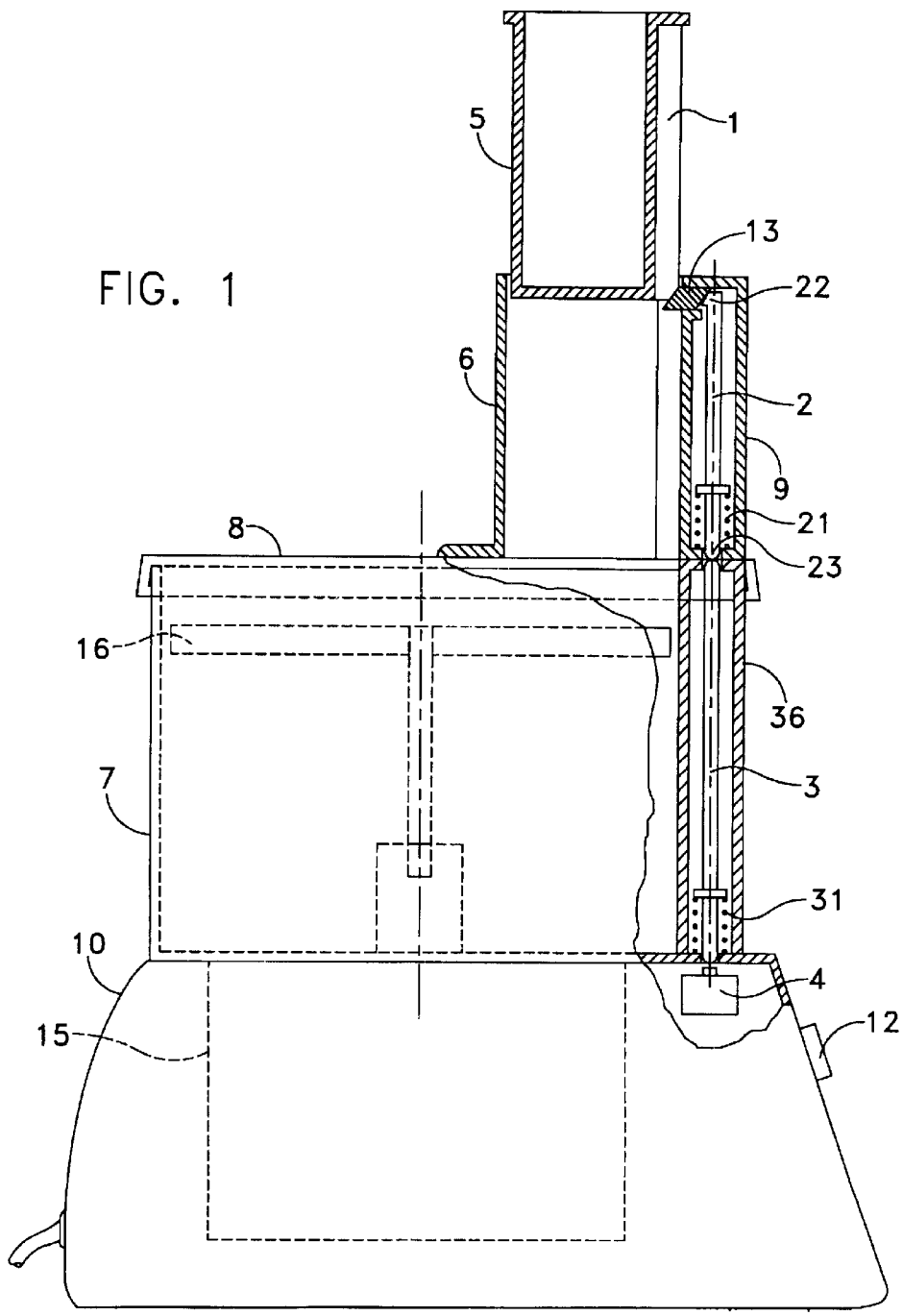
FIG. 1, a view in vertical part section of a processor equipped with a safety device according to the invention.

FIG. 1 shows, like in numerous processors of this type, a base 10 on which is removably mounted a bowl 7 closed by a lid 8. The base includes an electric motor driving a tool which, in the example depicted, is a vegetable-cutting disc 16. Projecting from the upper part of the lid 8 is a chute or hopper 6 for introducing the products that are to be worked. A pusher 5 is slideably mounted in this hopper. Of course, the bowl 7 is locked onto the base 10 and, during operation, the lid 8 is locked onto the bowl 7 by known means (not depicted). As described in U.S. Pat. No. 3,892,365, the bowl has, along one generatrix, a housing 36 inside which is slideably mounted a bowl rod 3, loaded by a spring 31 and the lower end of which can bear against the control member of a switch 4 mounted in series in the electric circuit that powers the motor 15.

In the aforementioned patent, the lid 8 was equipped with a cam bearing against the upper end of the rod 3 so that, when the lid 8 is in place, the lower end of the rod 3 bears against the control member of the switch 4, allowing the motor to be switched on by, for example, a control button 12.

Such a cam does not exist in the safety device according to the invention. By contrast, validation of the switching-on of the motor entails pressing on the upper end of the bowl rod 3.

According to the invention, this pressing is exerted by a rod 2 slideably mounted in a housing 9 extending along the chute, the rod 2 being loaded by a spring 21 which, in the absence of any urging, pushes the rod 2 back upwards.

It is the introduction of the pusher which will lower the rod 2 which will then bear against the upper part of the rod 3 and lower the latter so that its lower end presses against the control member of the switch 4.

Figure 3:
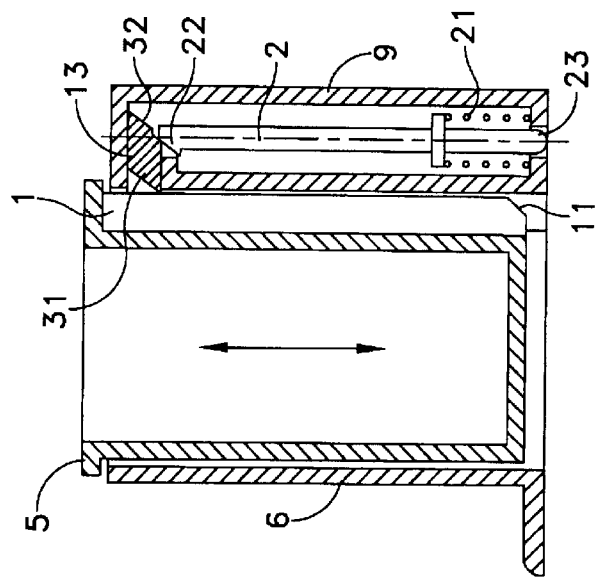
FIG. 3, under the same conditions as in FIG. 2, the pusher completely introduced into the chute, FIG. 4, a perspective view of the device in the work position.
Figure 2:
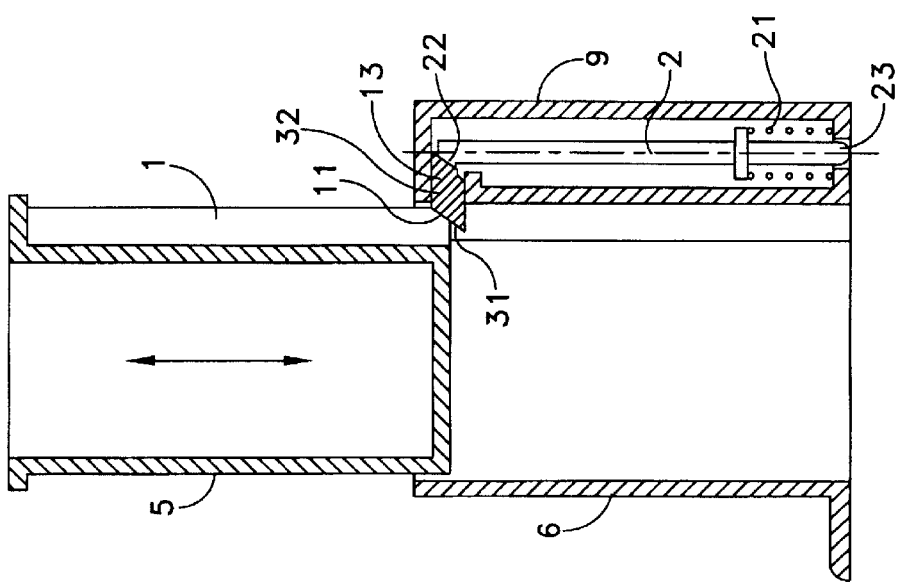
FIG. 2, in vertical section, the upper part of the lid during introduction of the pusher into the chute.

The way in which the upper part of the processor works will now be described with reference to FIGS. 2 and 3. In FIG. 2, the pusher 5 is beginning to be introduced into the chute 6. Over its entire height it has a rib, blade or projection 1 which, at its lower part, has a chamfer or cut surface 11.

As the pusher begins to be introduced, the blade 1 bears via the inclined surface 11 on the face 31 of the slider 13 moveable against the upper surface of the housing 9 at right angles to the direction of insertion of the pusher 5. It is preferably made of a hard plastic such as polyamide or DELRIN, coated with a non-stick coating for example of PTFE, but may just as easily be fitted with rollers. Thus, the entry of the pusher will move the slider 13 to the right in the figure. The side 32 opposite the inclined surface 11 is parallel to the latter, the cross section of the slider consisting of a parallelogram. The upper end 22 of the rod 2 is pressed against this parallel face, the end 22 being shaped in such a way that it can slide against the face 32. As mentioned previously, the spring 21 returns the rod 2 to a raised position as depicted in FIG. 2. As soon as the cut surface 11 of the rib 1 escapes from the slider 13, the latter remains immobilized on the right-hand side of the housing 9 by the longitudinal face of the rib 1 as depicted in FIG. 3. The movement of the slider 13 to the right converts the lateral force applied by the pushing-down of the pusher 5 into a vertical force which is applied to the head 22 of the rod 2 which causes the latter to move down as depicted in FIG. 3. At that moment, the rod 2 moves down, its lower end 23 projects beneath the housing 9. If the bowl and the lid are in the working position, that is to say if the bowl is locked onto the base and if the lid is locked onto the bowl, then the rods 2 and 3 are aligned and the lower end 23 of the rod 2 bears against the upper part of the rod 3, which causes it to be lowered and its lower part to come into contact with the member controlling the switch 4. Thus, it is whether or not the pusher is introduced into the chute which validates the starting of the motor using the control button 12.

Operational safety of the processor is ensured by the presence of the pusher inside the chute as soon as the pusher is introduced. The chute can thus have any cross section and a relatively short height without any danger to the user's hand.

The embodiment which has just been described does, however, have one disadvantage, namely that the lid cannot be removed from the bowl unless the pusher is removed from the chute which, as far as the user is concerned, may be a practical disadvantage. What happens is that it may be desirable for the lid and the pusher to be removed simultaneously without the latter having been extracted beforehand.

Figure 4:
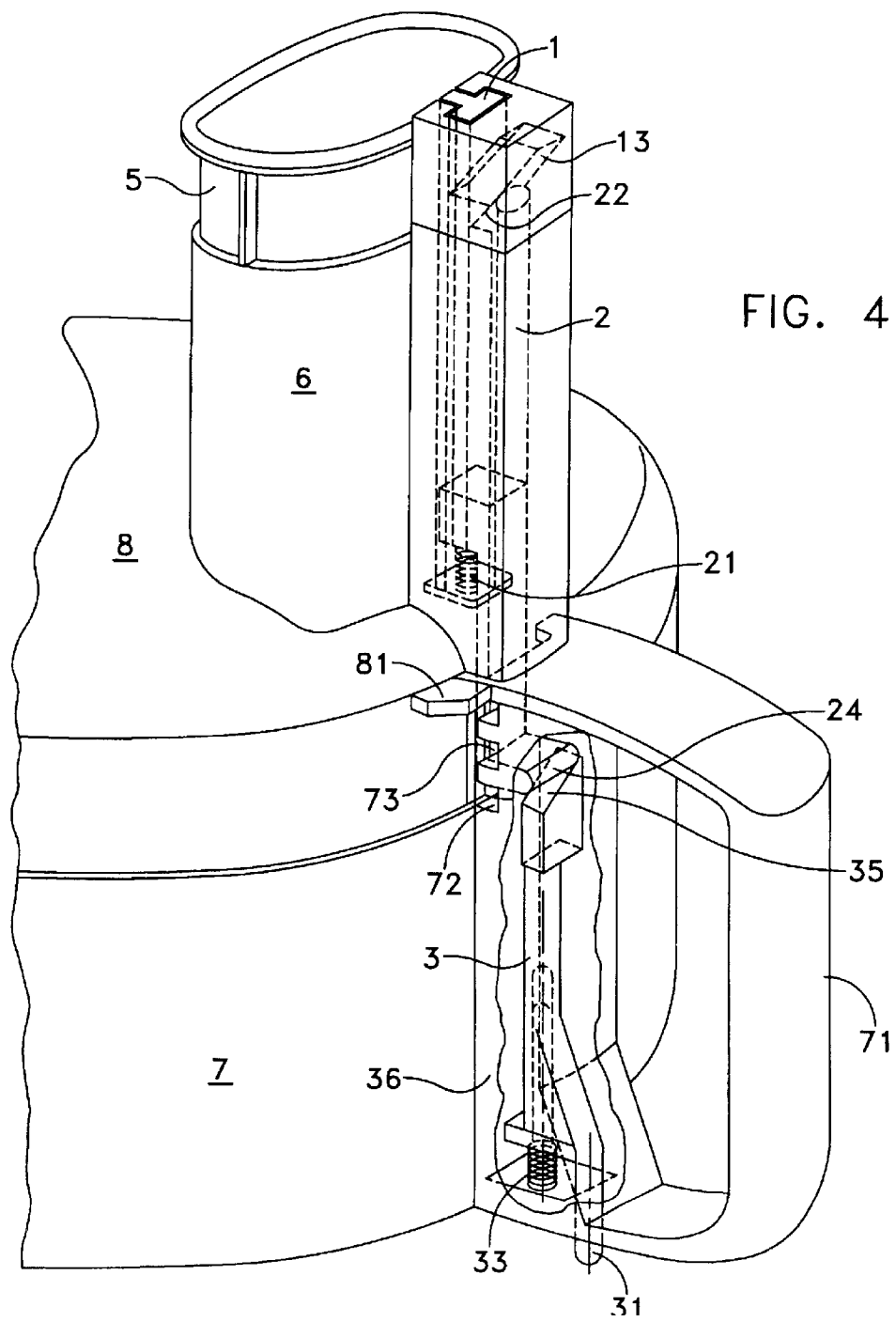

FIG. 4 again shows the elements mentioned previously. The lower part 33 of the rod 3, the lower part of which is forked, projects and acts on the control of the switch 4 (not depicted in this figure). This position results from the introduction of the pusher into the chute 6 which moves the member 13 sideways and results in a pressure on the rod 2 which pushes the lug 24 down which itself pushes down the rod 3 and causes the end 33 to project. For this purpose, the part 34 has an inclined surface 35 against which the lug 24 bears.

Figure 5:
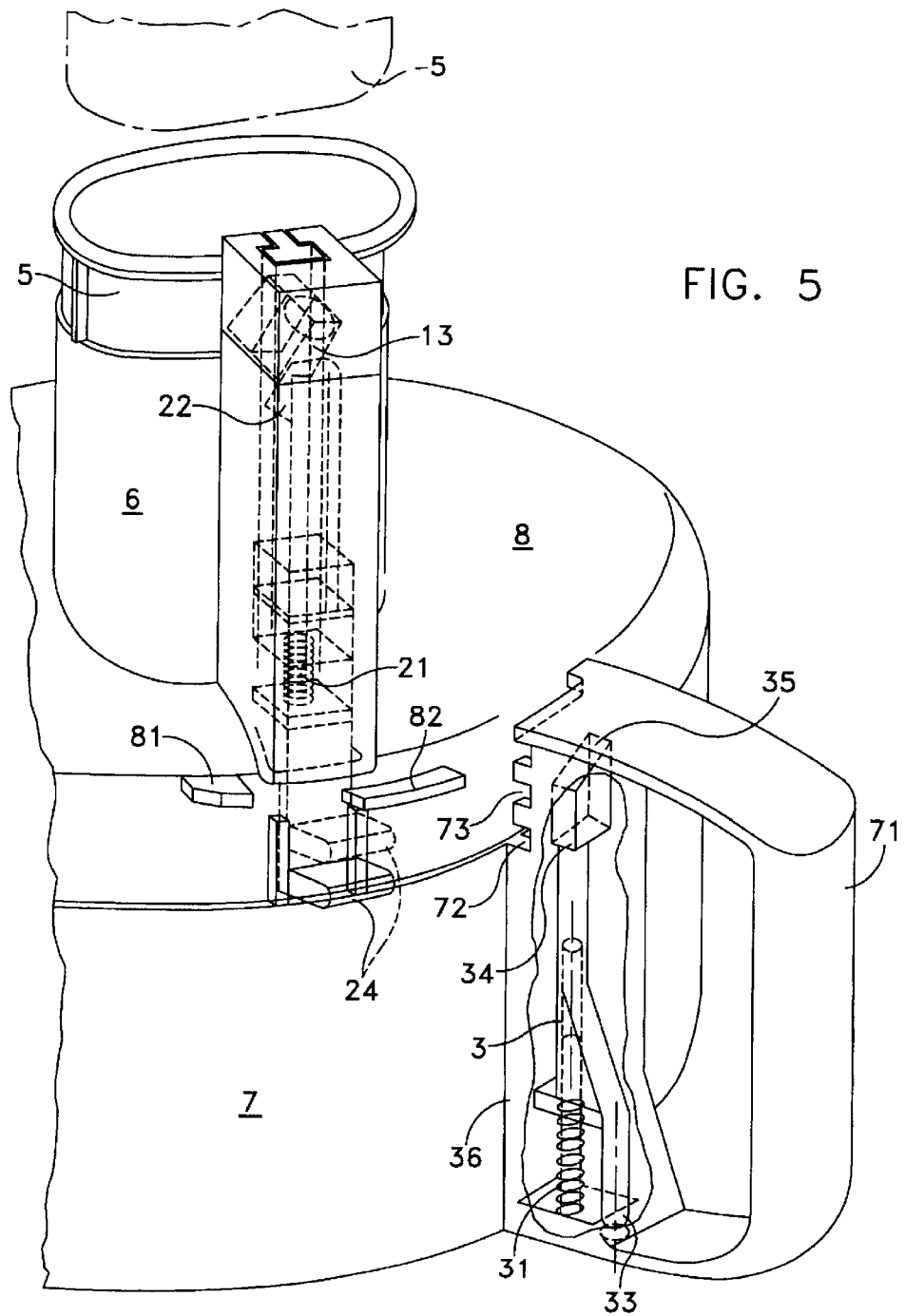
FIG. 5, under the same conditions as in FIG. 4, the device in the position for extracting the lid.

In the handle 71 of the bowl 7, in the upper region where the handle meets the bowl, there are three notches, one of which is reserved for the passage of a tenon 82 (FIG. 5). Above this notch there are two other notches, a lower notch 72 and an upper notch 73, which allow the lug 24 to enter the handle when (notch 72) the pusher 5 is in the chute 6 and (notch 73) when the pusher is not in the chute. In both instances, the lug 24 can be brought above the part 34 to press on it or to release it. A stop 81 provided on the lid immobilizes the latter in terms of rotation in the desired position which, incidentally, corresponds to the position in which the lid 8 is locked on the bowl 7.

By means of these notches, the lug 24 can enter the chamber 36 of the rod 3. However, it can also leave it, allowing the lid 8 to be removed without withdrawing the pusher from the chute.

FIG. 5 depicts the same device after the pusher has been extracted from the chute and the lid has been rotated in the clockwise direction. Under the action of the spring 31, the rod 3 has risen back up and its lower end 33 no longer projects. If the pusher 5 is in the chute, the lug 24 occupies the position depicted in solid line. If the pusher has been extracted therefrom, the lug 24 occupies the position depicted in broken line.

It goes without saying that variations can be introduced, particularly by substituting equivalent technical means without thereby departing from the scope of the invention.

What is claimed is:

1. Mechanical safety device for a food processor, comprising a base containing an electric motor, a shaft on which various tools can be mounted, and a bowl closed by a lid removably attached thereto, the bowl being equipped with a bowl safety rod, loaded by a spring, acting on a switch mounted in the base, the lid having at least one chute for introducing food into the bowl, a pusher being selectively introduced into the chute and being movable in a vertical direction in the chute, wherein the lid is equipped with a lid rod aligned substantially with the bowl safety rod, the pusher having a longitudinal projection bearing against a slider that is moved by the lid rod in at least one of horizontal and oblique translation to displace an upper part of the bowl safety rod, wherein the slider converts vertical downward movement of the pusher into vertical downward movement of the lid rod, and a lower end of the lid rod bears against the upper part of the bowl safety rod due to movement of the slider, causing the lower part of the bowl safety rod to bear against the switch.

2. The mechanical safety device according to claim 1, wherein the projection of the pusher has on a lower end an inclined surface bearing against a corresponding first inclined face of the slider when the pusher is advanced in the chute.

3. The mechanical safety device according to claim 2, wherein the slider has a second inclined face bearing on an upper end of the lid rod when the slider is moved by the pusher.

4. The mechanical safety device according to claim 3, wherein the first inclined face of the slider faces upward, and wherein downward movement of the pusher results in a radially outward movement of the slider.

5. The mechanical safety device according to claim 4, wherein the second inclined face of the slider faces downward, and the radially outward movement of the slider results in a vertical downward movement of the lid rod.

6. The mechanical safety device according to claim 5, wherein the lid rod is spring biased in an upward direction.

7. The mechanical safety device according to claim 1, wherein the slider has a parallelogram cross section, with first and second inclined faces parallel to one another, a lower end of the longitudinal projection of the pusher bearing on the first inclined face of the slider when the pusher is advanced in the chute causing the slider to move and the second inclined face of the slider bearing on an upper end of the lid rod when the slider is moved by the pusher.

8. The mechanical safety device according to claim 7, wherein the first inclined face is faced upwardly, and downward movement of the pusher results in radially outward movement of the slider.

9. The mechanical safety device according to claim 8, wherein the second inclined face is faced downwardly, and the radially outward movement of the slider results in vertical downward movement of the lid rod.

10. The mechanical safety device according to claim 9, wherein the lid rod is biased in an upper direction by a spring.

11. Mechanical safety device for a food processor comprising a base containing an electric motor, a shaft on which various tools can be mounted, a bowl closed by a lid removably attached thereto, and a safety rod movably mounted so as to act on a switch mounted in the base, wherein the lid has at least one chute for introducing food into the bowl, and a pusher that is movable longitudinally in the chute for feeding the food through the chute, wherein the pusher has a projection that displaces and laterally translates a slider as the pusher passes a position in the chute, the projection translating the slider laterally to a position at which the slider longitudinally displaces an end of the safety rod, whereby the slider advances the bowl safety rod for operating the switch when the pusher is at and beyond said position in the chute.

12. The mechanical safety device according to claim 11, wherein the slider has opposite inclined surfaces at which, respectively, the pusher engages and moves the slider laterally, and the slider engages and moves the safety rod longitudinally.

* * * * *